US010215298B2

(12) United States Patent
Cornall et al.

(10) Patent No.: US 10,215,298 B2
(45) Date of Patent: Feb. 26, 2019

(54) DEVICE FOR CONTROLLING THE RELEASE OF GAS FROM A PRESSURISED CONTAINER

(71) Applicant: Kidde Graviner Limited, Slough, Berkshire (GB)

(72) Inventors: Stephen J. Cornall, Windsor (GB); Hitesh L. Mistry, Middlesex (GB)

(73) Assignee: KIDDE GRAVINER LIMITED, Berkshire (GB)

( * ) Notice: Subject to any disclaimer, the term of this patent is extended or adjusted under 35 U.S.C. 154(b) by 0 days.

(21) Appl. No.: 15/209,913

(22) Filed: Jul. 14, 2016

(65) Prior Publication Data

US 2017/0016576 A1 Jan. 19, 2017

(30) Foreign Application Priority Data

Jul. 17, 2015 (GB) .................................. 1512627.9

(51) Int. Cl.
*F16K 17/40* (2006.01)
*F17C 13/04* (2006.01)
*F17C 13/06* (2006.01)

(52) U.S. Cl.
CPC ............ *F16K 17/403* (2013.01); *F17C 13/04* (2013.01); *F17C 13/06* (2013.01); *F17C 2205/032* (2013.01); *F17C 2205/0332* (2013.01); *F17C 2270/0754* (2013.01); *F17C 2270/0772* (2013.01)

(58) Field of Classification Search
CPC .... F17C 7/00; F17C 7/02; F17C 13/04; F17C 13/06; F17C 2205/032; F17C 2205/0329; F17C 2205/0332; F16K 17/403

USPC ............................. 137/68.3, 68.29; 220/89.3
See application file for complete search history.

(56) References Cited

U.S. PATENT DOCUMENTS

| 2,446,626 A | 8/1948 | Baxter |
| 2,496,456 A | 2/1950 | Elliott |
| 2,656,850 A | 10/1953 | Garretson |
| 2,947,315 A | 8/1960 | Connell |

(Continued)

FOREIGN PATENT DOCUMENTS

| GB | 1334648 A | 10/1973 |
| KR | 100302971 A | 7/2001 |
| WO | 2007013715 A1 | 2/2007 |

OTHER PUBLICATIONS

EP Communiation Pursuant to Article 94(3) EPC for Application No. 16 179 918.4-1010 dated Jan. 15, 2018, 5 pages.

(Continued)

*Primary Examiner* — P. Macade Nichols
(74) *Attorney, Agent, or Firm* — Cantor Colburn LLP

(57) ABSTRACT

A device for controlling the release of gas from a pressurized container includes a plug comprising a passage therethrough and a diaphragm within the passage. The diaphragm is configured to initially prevent flow of gas through said passage, and is rupturable or displaceable to allow gas to flow through said passage once said diaphragm is ruptured or displaced. The device further comprises a screw located within the plug and comprising a lance configured to move towards said diaphragm upon rotation of the screw. The lance is configured to rupture or displace the diaphragm so as to allow flow of gas through the passage and out of the plug, once the screw is rotated a predetermined amount.

11 Claims, 2 Drawing Sheets

(56) References Cited

U.S. PATENT DOCUMENTS 3,709,255 A     1/1973   Ciotti
3,989,057 A    11/1976   Muddiman
5,845,669 A * 12/1998   Ross ........................ E21B 23/04
                                                                          137/68.3

OTHER PUBLICATIONS

GB Examination Report for Application No. GB1512627.9 dated Mar. 1, 2018, 36 pages.
GB Search Report for Application No. GB1512627.9 dated Jan. 8, 2016; 4 Pages.
European Search Report for Application No. 16179918.4-1760 dated Dec. 1, 2016. 11 Pages.

* cited by examiner

DEVICE FOR CONTROLLING THE RELEASE OF GAS FROM A PRESSURISED CONTAINER

FOREIGN PRIORITY

This application claims priority to United Kingdom Patent Application No. 1512627.9 filed Jul. 17, 2015, the entire contents of which is incorporated herein by reference.

FIELD

The present disclosure relates generally to a device for controlling the release of gas from a pressurised container.

BACKGROUND

Pressurised containers are used widely and in many applications. For example, in the fire and safety industry an inert gas may be held in a container at a raised pressure. The gas may be used to suppress a fire in an environment, such as a room or aircraft, or to inflate a safety device, such as an airbag. Typically, a valve is provided that controls the release of gas from the pressurised container to the environment.

It has been found that in certain situations it may be necessary or desirable to depressurise such containers. What is desired, therefore, is an effective method of depressurising a container.

SUMMARY

In accordance with the disclosure, there is provided an apparatus or device for controlling the release of gas from a pressurised container, the device comprising: a plug comprising a passage therethrough; a diaphragm within the passage, wherein the diaphragm is configured to initially prevent flow of gas through the passage, and is rupturable or displaceable to allow gas to flow through the passage once the diaphragm is ruptured or displaced; a screw located within the plug and comprising a lance configured to move towards the diaphragm upon rotation of the screw, wherein the lance is configured to rupture or displace the diaphragm so as to allow flow of gas through the passage and out of the plug, once the screw is rotated a predetermined amount; wherein optionally the plug, screw and diaphragm are removeable or replaceable as a single unit. That is, movement or removal of the plug causes automatic movement or removal of the screw and diaphragm.

A device as described can be used as a simple and effective method of plugging a pressurised chamber, due to its consituent parts being removeable or replaceable as a single unit. Conventional devices may, for example, use a diaphragm that is separate to the plug, which is not as easy to use. Further features are described below that have additional advantages over conventional devices for controlling the release of gas from pressurised containers.

The plug may be configured to plug an outlet of a pressurised container. The device may consist of the plug, diaphragm and screw. The diaphragm may be welded to the plug. The diaphragm may be located at an end of the plug and/or passage that is locatable within an outlet of a pressurised container, or is located within the outlet of said pressurised container.

The lance may comprise a non-circular transverse cross-section. For example, the lance may comprise a triangular, square, pentagonal, hexagonal, elliptical, parabolic, hyperbolic, or polygonal transverse cross-section. The transverse cross-section may comprise a closed plane figure or shape having three or more sides.

The non-circular transverse cross-section may be provided along a majority of the length of the lance. The lance may comprise a pointed end portion, e.g. a sharpened tip, for intially rupturing or displacing the diaphragm. The lance may further comprise a non-circular transverse cross-section along the entirety of its length, with the exception of the pointed end portion, or including the pointed end portion.

The non-circular transverse cross-section may change as one moves along the length of the lance. For example, the transverse cross-section may be square until the pointed end portion, at which point the transverse cross-section becomes rectangular, wherein the rectangle becomes progressivley smaller until the tip or end of the lance.

The passage and/or the screw may be coaxial with a longitudinal axis of the plug. The plug and/or passage and/or screw may be axially symmetric. The axis in question may be the longitudinal axis of the plug, passage or screw respectively.

The screw may be rotatable to a given distance into the plug, wherein at the given distance the diaphragm is ruptured or displaced and gas is able to flow through the passage and out of the plug. The given distance may be the point at which the diaphragm is configured to rupture or displace.

The screw may be rotatable to a maximum distance into the plug, wherein at the maximum distance gas is able to flow through the passage and out of the plug.

The passage may comprise a first portion having a relatively small diameter and a second portion having a relatively large diameter that comprises a threaded portion.

The screw may comprise a lance portion having a relatively small diameter and comprising the lance, and a threaded portion having a relatively large diameter that is configured to cooperate with the threaded portion of the passage.

The device may comprise one or more gas paths or outlets that extend from the first portion of the passage to an outer surface of the plug for discharging gas from the first portion of the passage to an external environment. The outlets may be arranged such that there is substantially no net lateral force on the plug as gas escapes from the plug in use. For example, where two outlets are provided, these may extend laterally from the central passage and may be located opposite one another. The central passage may be symmetrical about a central and/or longitudinal axis of the plug.

The diaphragm may be located within the first portion of the passage, and may be located at an end of the first portion of the passage, for example an end configured to be located within an outlet of a pressurised container.

The lance portion of the screw may extend into the first portion of the passage.

The screw may be rotatable relative to the plug, and may be removable from the plug.

In accordance with an aspect of the disclosure, there is provided an apparatus comprising: a pressurised container having a gas outlet; a device as described above and located at least partially within the outlet so as to initially prevent gas flow out of the outlet; wherein upon rupturing or displacing the diaphragm, gas is configured to flow out of the outlet and into an external environment via the passage.

The container may comprise a main outlet and an auxiliary outlet. The device or plug may be located at least partially within the auxiliary outlet, so as to initially prevent and/or control gas flow out of the auxiliary outlet.

The container may comprise an outlet valve. The device or plug may be located at least partially within the outlet valve. The outlet valve may comprise a main outlet and an auxiliary outlet, and the device or plug may be located within the auxiliary outlet so as to prevent and/or control an auxiliary gas flow out of the auxiliary outlet. The device may be used to plug or seal part of the outlet valve that is configured to be exposed to the pressure of the container, e.g. before a sealing mechanism or other device within the valve that prevents the contents of the container escaping through the main outlet. In this case the device as described herein would provide an easy manner in which to depressurise the container, without having to release its contents through the main outlet.

In accordance with the disclosure, there is provided an apparatus or device for controlling the release of gas from a pressurised container, the device comprising: a plug comprising a passage therethrough; a diaphragm within the passage, wherein the diaphragm is configured to initially prevent flow of gas through the passage, and is rupturable or displaceable to allow gas to flow through the passage once the diaphragm is ruptured or displaced; a screw located within the plug and comprising a lance configured to move towards the diaphragm upon rotation of the screw, wherein the lance is configured to rupture or displace the diaphragm so as to allow flow of gas through the passage and out of the plug, once the screw is rotated a predetermined amount; wherein the screw may be rotatable to a maximum distance into the plug, and at the maximum distance gas is able to flow through an outlet passage and out of the plug, for example to an external environment.

In accordance with the disclosure, there is provided a kit for controlling the release of gas from a pressurised container, the kit comprising: a plug comprising a passage therethrough; a diaphragm within the passage, wherein the diaphragm is configured to initially prevent flow of gas through the passage, and is rupturable or displaceable to allow gas to flow through the passage once the diaphragm is ruptured or displaced; a first screw or bolt locatable within the passage, wherein the length of the first screw or bolt is such that it cannot contact the diaphragm in use; a second screw locatable within said plug and comprising a lance configured to move towards said diaphragm upon rotation of said second screw, wherein said lance is configured to rupture or displace said diaphragm so as to allow flow of gas through said passage and out of said plug, once said second screw is rotated a predetermined amount.

The length of the first screw or bolt may be relative to the length of the passage. For example, if the passage is X cm and the diaphragm is located at the end of the passage, then the first screw or bolt should be less than X cm in length, or X−1 cm in length.

The kit may comprise a container or valve having an outlet, and the plug may be configrured to be inserted into and/or seal the outlet. The plug and outlet may have cooperating features, such as screw threads, to effectuate the seal.

In accordance with an aspect of the disclosure, there is provided a method of using the device or the apparatus as described above, the method comprising: rotating the screw relative to the plug to an extent that will cause the lance of the screw to rupture or displace the diaphragm to allow gas to flow out of the outlet and into an external environment via the passage.

In accordance with an aspect of the disclosure, there is provided a device for controlling the release of gas from a pressurised container, the device comprising: a plug comprising a passage therethrough; a diaphragm within said passage, wherein said diaphragm is configured to initially prevent flow of gas through said passage, and is rupturable or displaceable to allow gas to flow through said passage once said diaphragm is ruptured or displaced; a screw located within said plug and comprising a lance configured to move towards said diaphragm upon rotation of said screw, wherein said lance is configured to rupture or displace said diaphragm so as to allow flow of gas through said passage and out of said plug, once said screw is rotated a predetermined amount; wherein said lance comprises a non-circular transverse cross-section.

For example, the lance may comprise a triangular, square, pentagonal, hexagonal, elliptical, parabolic, hyperbolic, or polygonal transverse cross-section. The transverse cross-section may comprise a closed plane figure or shape having three or more sides.

The non-circular transverse cross-section may be provided along a majority of the length of the lance. The lance may comprise a pointed end portion, e.g. a sharpened tip, for intially rupturing or displacing the diaphragm. The lance may further comprise a non-circular transverse cross-section along the entirety of its length, with the exception of the pointed end portion, or including the pointed end portion.

The non-circular transverse cross-section may change as one moves along the length of the lance. For example, the transverse cross-section may be square until the pointed end portion, at which point the transverse cross-section becomes rectangular, wherein the rectangle becomes progressivley smaller until the tip or end of the lance.

BRIEF DESCRIPTION OF THE DRAWINGS

Various embodiments will now be described, by way of example only, and with reference to the accompanying drawings in which.

DETAILED DESCRIPTION

An embodiment is shown with reference to FIGS. 1-5.

Figure 1:
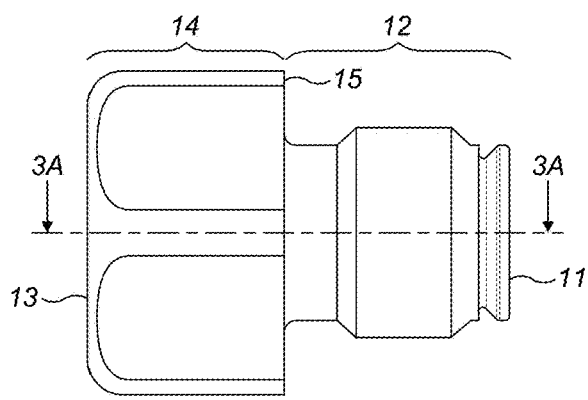
FIG. 1 shows a side view of a plug in accordance with an embodiment.

FIG. 1 shows a side view of a device comprising a plug 10 that may be arranged and adapted to fit into an outlet of a container (not shown) for holding a substance, for example a gas at a raised pressure.

A first portion 12 of the plug 10 may be configured to extend into an outlet such that it may form a seal and prevent gas from escaping the container. The first portion 12 may comprise a first end 11 of the plug 10. The first portion 12 of the plug 10 may have an interference, press or snap fit arrangement with the container, or could be provided with a threaded portion to allow the plug 10 to screw into an outlet of a pressurised container.

A sealing engagement may be present between an outer surface of the first portion 12 and the outlet. For example, one or more washers may be provided to fit between and seal the outer surface of the first portion 12 and the container, or cooperating threaded portions could be provided on the outer surface of the first portion 12 and the container.

A second portion 14 of the plug may be configured to remain exterior to the outlet, and can comprise a shoulder or surface 15 that may be configured to rest on the exterior of the container when the first portion 12 of the plug 10 is inserted into the outlet. The second portion 14 may comprise a second end 13 of the plug 10, which may be opposite the first end 11.

Figure 2:
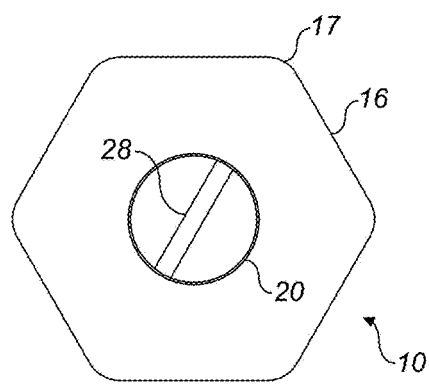
FIG. 2 shows a top view of the plug of FIG. 1

FIG. 2 shows a top view of the second portion 14 of the plug 10.

The second portion 14 may be substantially hexagonal, and may comprise six flat portions 16 and/or six rounded edges 17. However, the second portion 14 can be of any shape or size as is desired for any particular application. From the top view of FIG. 2 it can be seen that a screw 20 may be located within the plug 10 and this will be described in more detail below.

Figure 3A:
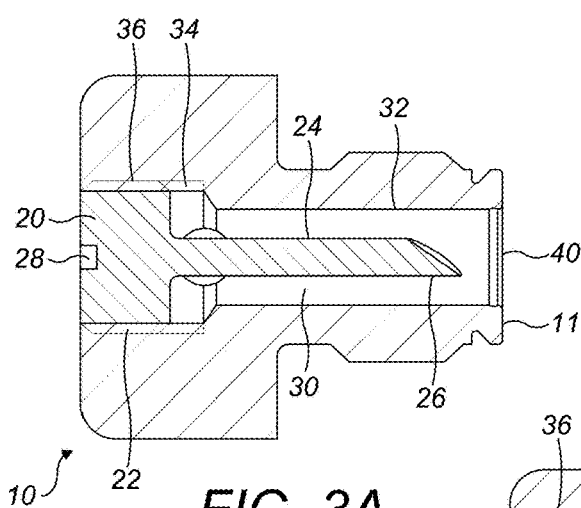
FIG. 3A shows a cross-section as indicated in FIG. 1.

FIG. 3A shows an axial cross-section through the plug 10 of FIG. 1.

The device or plug 10 may comprise an internal passage 30 that may extend through the plug 10 from the first end 11 to the second end 13. The screw 20 may be located within part of the internal passage 30. The internal passage 30 may comprise a first portion 32 having a first, relatively small internal diameter, as well as a second portion 34 having a second, relatively large internal diameter. The second portion 34 may comprise a threaded portion 36 along at least part of its length.

The screw 20 may comprise a threaded portion 22 that may cooperate with the threaded portion 36 of the internal passage 30. The screw 20 may further comprise an elongate portion 24 that extends along the internal passage 30 and ends in a sharpened tip 26. The elongate portion 24 may be cylindrical such that it has a circular transverse cross-section, i.e. perpendicular to the longitudinal axis of the elongate portion 24.

Figure 3B:
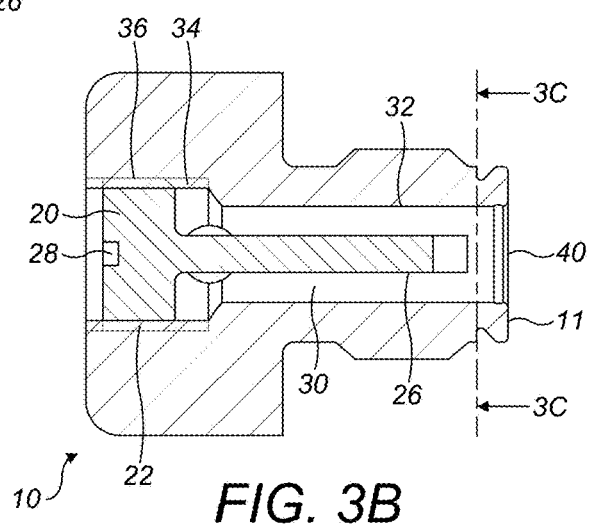
FIG. 3B shows an alternative embodiment to FIG. 3A.
Figure 3C:
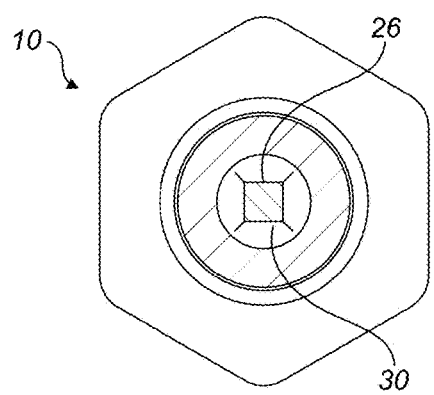
FIG. 3C shows a cross-section as indicated in FIG. 3B
Figure 4:
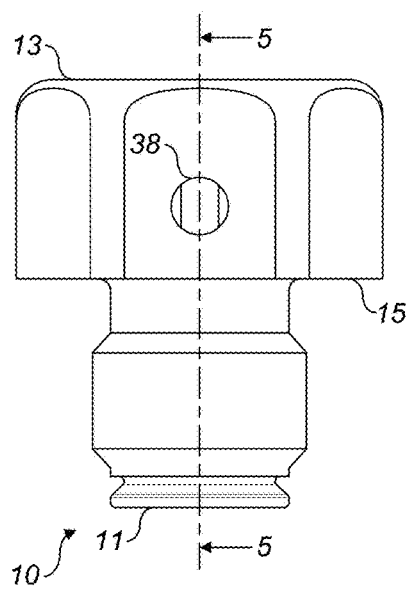
FIG. 4 shows a further side view of the plug of FIG. 1.
Figure 5:
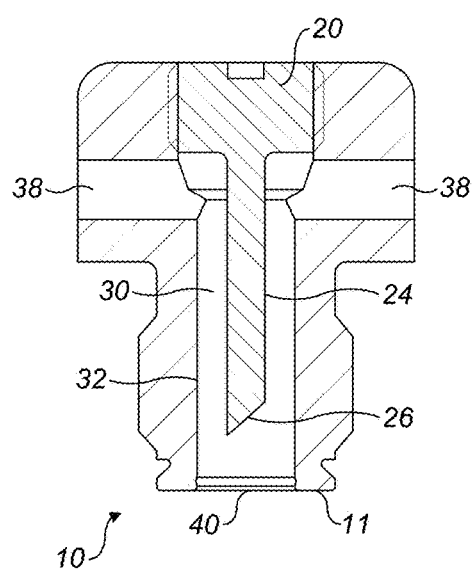
FIG. 5 shows a cross-section as indicated in FIG. 4.

In various embodiments the elongate portion may comprise a non-circular or irregular transverse cross-section. For example, the elongate portion 24 may comprise a triangular, square, pentagonal, hexagonal, elliptical, parabolic or hyperbolic transverse cross-section. An example is shown in FIGS. 3B and 3C, in which the elongate portion 24 has a square transverse cross-section.

Provision of a non-circular cross-section means that gas may be allowed to escape through the diaphragm as the elongate portion protrudes through it, as described below. This may not be possible, or may be more difficult with a cylindrical elongate portion 24 since the sides of the elongate portion 24 can form a complete seal as it rotates.

A cavity 28 (see also FIG. 2) may be provided on the end of the screw 20 opposite the tip 26. The cavity 28 may be in the form of a slot, cross, recessed square or other shape. This can allow a screwdriver to be used to turn the screw 20, for example a flat-head screwdriver or Phillips screwdriver.

Rotation of the screw in a first, e.g. clockwise direction may cause the screw 20 to move further into the plug 10 towards the first end 11. Rotation of the screw 20 in a second, e.g. anticlockwise direction may cause the screw to move in the opposite direction, out of the plug 10. The reverse arrangement is also possible.

The device may comprise a rupturable or displaceable diaphragm 40. The diaphragm 40 may initially provide a sealing function, for example to prevent gas from escaping the container through the internal passage 30. The plug 10, screw 20 and diaphragm 40 may all be part of a single unit that is replaceable and/or removable as a single unit. This provides a simple apparatus or means for plugging an outlet of a container whilst providing a controlled release of gas therefrom, as described below.

It has been found that certain situations may require the gas to be released from the container manually, and in a controlled manner. The technology of the present disclosure provides such a functionality and an example is shown in FIGS. 1-5.

As can be appreciated from FIG. 3, as the screw 20 is turned in a first direction it may eventually contact the diaphragm 40. Further turning of the screw 20 may cause the tip 26 to puncture and/or displace the diaphragm 40 and may allow gas to release from the container into the internal passage 30.

The diaphragm 40 can be made of a material that is softer than that of the screw 20, or the tip 26 of the screw 20. For example, the screw 20 or tip 26 can be a first metal, whilst the diaphragm may be second metal, wherein the second metal is softer than the first metal. This can allow easy penetration of the diaphragm 40 by the screw 20. The diaphragm 40 may, alternatively or additionally, comprise lines of weakness that may be positioned so as to be scored by the tip 26 as it advances. The diaphragm may be held in place by an interference, press or snap fit arrangement, wherein the force of the screw is not sufficient to displace the diaphragm. Rather, the diaphragm 40 may be punctured as the screw 20 advances towards and through it. The diaphragm 40 may be integral with the body of the plug 10.

Other embodiments are contemplated in which the diaphragm 40 may be displaced, rather than ruptured by the screw 20. For example, the diaphragm 40 may be held in place by an interference, press or snap fit arrangement with the end 11 of the plug 10, and the tip 26 of the screw 20 could be configured to push or displace the diaphragm out of such an arrangement to allow gas to be released from the container.

Gas may be released from the internal passage 30 into the external environment via one or more outlets 38. The one or more outlets 38 may be provided that allow gas to be released immediately once the diaphragm 40 is ruptured. Any number of outlets 38 can be provided, and in any orientation or arrangement as necessary for any particular application. The outlets 38 may be arranged opposite each other or in some other arrangement that ensures there is no net force as a result of the gas exiting the outlets.

The one or more outlets 38 may be located within the second portion 14 of the plug (see FIG. 1) and/or can bridge both the first portion 32 and second portion 34 of the internal passage 30. In this manner, even if the screw 20 is rotated to its maximum extent, i.e. as far as it can travel towards the first end 11 where the diaphragm is located, gas can still escape through the outlets 38 since they are at least partially located in the first passage 32.

The device or apparatus as described herein may be used to plug or seal an outlet to a container (not shown). The outlet may be an auxiliary outlet, i.e. secondary to a main outlet or valve that is connected to, e.g. a fire suppression network or another device, for example an inflatable device such as an airbag. Pressurised containers may be provided with such auxiliary outlets to relieve pressure in the container if this is desired, without having to release the gas through the primary outlet or valve to deploy fire suppressant or activate a device (e.g. an airbag).

The device or apparatus as described herein may also be used to plug or seal part of an outlet valve that is for controlling the release of gas from a pressurised container. In these embodiments, the device could be used to plug or seal part of the outlet valve that is configured to be exposed to the pressure of the container, e.g. before a sealing mechanism within the valve. The plug would provide an easy manner in which to depressurise a container that the valve is connected to, without having to operate the valve.

The plug as described herein may also be used to plug or seal part of an outlet of a gassing device, for example a device configured to release gas at a high rate. The plug may be used to safely depressurise such a device.

The plug, diaphragm and screw could be provided as part of a kit. In this case a first screw could be provided that is locatable in the plug, as well as a second screw, wherein the second screw corresponds to the screw comprising a lance described above. The first screw could have a length such that it cannot contact the diaphragm in use. In this manner, the first screw could be used as a safety or 'dummy' screw that cannot puncture or displace the diaphragm. When it is desired to depressurise a container or valve into which the plug is inserted, the first screw can be replaced with the second screw and operated as described herein.

Although the present invention has been described with reference to preferred embodiments, it will be understood by those skilled in the art that various changes in form and detail may be made without departing from the scope of the invention as set forth in the accompanying claims.

The invention claimed is:

1. A device for controlling the release of gas from a pressurised container, the device comprising:
   a plug comprising a passage therethrough;
   a diaphragm within said passage, wherein said diaphragm is configured to initially prevent flow of gas through said passage, and is rupturable or displaceable to allow gas to flow through said passage once said diaphragm is ruptured or displaced;
   a screw located within said plug and comprising a lance configured to move towards said diaphragm upon rotation of said screw, wherein said lance is configured to rupture or displace said diaphragm so as to allow flow of gas through said passage and out of said plug, once said screw is rotated a predetermined amount;
   wherein said plug, screw and diaphragm are removeable or replaceable as a single unit;
   wherein said passage and said screw are coaxial with a longitudinal axis of said plug.

2. The device as claimed in claim 1, wherein said lance comprises a non-circular transverse cross-section.

3. The device as claimed in claim 1, wherein said screw is rotatable to a maximum distance into said plug, wherein at said maximum distance gas is able to flow through said passage and out of said plug.

4. A device for controlling the release of gas from a pressurised container, the device comprising:
   a plug comprising a passage therethrough;
   a diaphragm within said passage, wherein said diaphragm is configured to initially prevent flow of gas through said passage, and is rupturable or displaceable to allow gas to flow through said passage once said diaphragm is ruptured or displaced; and
   a screw located within said plug and comprising a lance configured to move towards said diaphragm upon rotation of said screw, wherein said lance is configured to rupture or displace said diaphragm so as to allow flow of gas through said passage and out of said plug, once said screw is rotated a predetermined amount;
   wherein:
   said plug, screw and diaphragm are removeable or replaceable as a single unit;
   said passage comprises a first portion having a relatively small diameter and a second portion having a relatively large diameter that comprises a threaded portion;
   said screw comprises a lance portion having a relatively small diameter and comprising said lance, and a threaded portion having a relatively large diameter that is configured to cooperate with said threaded portion of said passage; and
   said plug comprises one or more gas paths or outlets that extend from said first portion of said passage to an outer surface of said plug for discharging gas from said first portion of said passage to an external environment.

5. The device as claimed in claim 4, wherein said diaphragm is located within said first portion of said passage.

6. The device as claimed in claim 4, wherein said lance portion of said screw extends into said first portion of said passage.

7. The device as claimed in claim 1, wherein said screw is rotatable relative to said plug.

8. The device as claimed in claim 1, wherein said screw is removable from said plug.

9. An apparatus comprising:
   a pressurised container having a gas outlet;
   a device as claimed in any preceding claim and located at least partially within said outlet so as to initially prevent gas flow out of said outlet; and
   wherein upon rupturing or displacing said diaphragm, gas is configured to flow out of said outlet and into an external environment via said passage; and
   wherein said container comprises a main outlet and an auxiliary outlet, and said device or plug is located at least partially within said auxiliary outlet, so as to initially prevent gas flow out of said auxiliary outlet.

10. An apparatus comprising:
    a pressurised container having a gas outlet; and
    a device as claimed in claim 1 and located at least partially within said outlet so as to initially prevent gas flow out of said outlet;
    wherein upon rupturing or displacing said diaphragm, gas is configured to flow out of said outlet and into an external environment via said passage;
    wherein said container comprises an outlet valve, and said device or plug is located at least partially within said outlet valve.

11. A method of using the device as claimed in claim 1, comprising:
    rotating said screw relative to said device or plug to an extent that will cause the lance of said screw to rupture or displace said diaphragm to allow gas to flow out of said outlet and into an external environment via said passage.

* * * * *